(12) United States Patent
Evans et al.

(10) Patent No.: US 11,833,498 B2
(45) Date of Patent: Dec. 5, 2023

(54) WITHDRAWAL SYSTEM

(71) Applicant: Johnson Matthey Process Technologies, Inc., Savannah, GA (US)

(72) Inventors: Martin Evans, Savannah, GA (US); Rick Fisher, Savannah, GA (US)

(73) Assignee: Johnson Matthey Process Technologies, Inc, Savannah, GA (US)

( * ) Notice: Subject to any disclaimer, the term of this patent is extended or adjusted under 35 U.S.C. 154(b) by 367 days.

(21) Appl. No.: 16/628,818

(22) PCT Filed: Jul. 6, 2018

(86) PCT No.: PCT/US2018/041050
§ 371 (c)(1),
(2) Date: Jan. 6, 2020

(87) PCT Pub. No.: WO2019/010391
PCT Pub. Date: Jan. 10, 2019

(65) Prior Publication Data
US 2020/0129944 A1    Apr. 30, 2020

Related U.S. Application Data

(60) Provisional application No. 62/529,693, filed on Jul. 7, 2017.

(51) Int. Cl.
*B01J 8/00*    (2006.01)
*B01J 4/00*    (2006.01)
(Continued)

(52) U.S. Cl.
CPC .............. *B01J 8/0015* (2013.01); *B01J 4/001* (2013.01); *B01J 4/008* (2013.01); *B01J 8/1809* (2013.01); *C10G 11/187* (2013.01); *B01J 2204/002* (2013.01); *B01J 2204/007* (2013.01); *B01J 2208/00176* (2013.01); *B01J 2208/00752* (2013.01)

(58) Field of Classification Search
CPC ........ B01J 8/0015; B01J 8/1809; B01J 4/001; B01J 4/008; B01J 2204/002; B01J 2204/007; B01J 2208/00176; B01J 2208/00752; C10G 11/187
See application file for complete search history.

(56) References Cited

U.S. PATENT DOCUMENTS

| | | | |
|---|---|---|---|
| 4,840,726 A | 6/1989 | Wakefield, Jr. | |
| 7,431,894 B2 | 10/2008 | Evans | |

(Continued)

FOREIGN PATENT DOCUMENTS

| | | |
|---|---|---|
| CN | 102177222 A | 9/2011 |
| WO | 2010028184 A2 | 3/2010 |

*Primary Examiner* — Timothy C Cleveland
(74) *Attorney, Agent, or Firm* — Kevin M. Carroll

(57) ABSTRACT

A withdrawal system for withdrawing particulate matter from a high-temperature unit of a high-temperature industrial process is disclosed. The withdrawal system comprises a material storage silo that comprises a vent line containing a first vent valve, one or more temperature sensors to measure temperature of the particulate matter in the material transfer line, and a controller that receives output measurements from the one or more temperature sensors to monitor and control flow of the particulate matter. The system does not contain a receiving vessel located in the material transfer line between the high-temperature unit and the material storage silo.

11 Claims, 4 Drawing Sheets

Sampling station for high-temperature particulate samples

(51) Int. Cl.
*B01J 8/18* (2006.01)
*C10G 11/18* (2006.01)

(56) References Cited

U.S. PATENT DOCUMENTS

| | | |
|---|---|---|
| 8,092,756 B2 | 1/2012 | Evans et al. |
| 8,146,414 B2 | 4/2012 | Evans et al. |
| 2004/0192860 A1 | 9/2004 | Hottovy et al. |
| 2016/0256842 A1 | 9/2016 | Evans et al. |
| 2016/0258689 A1 | 9/2016 | Evans et al. |

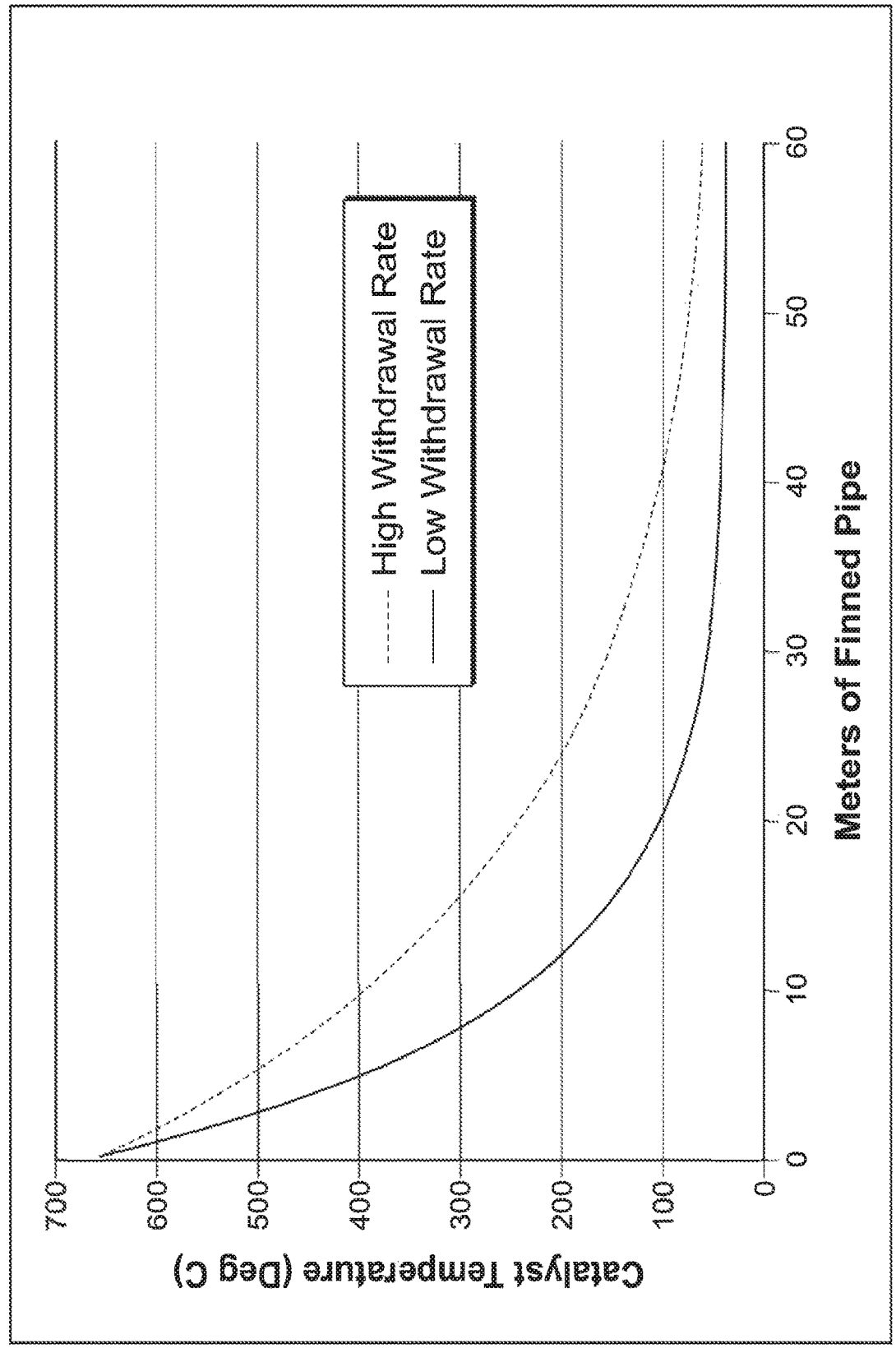

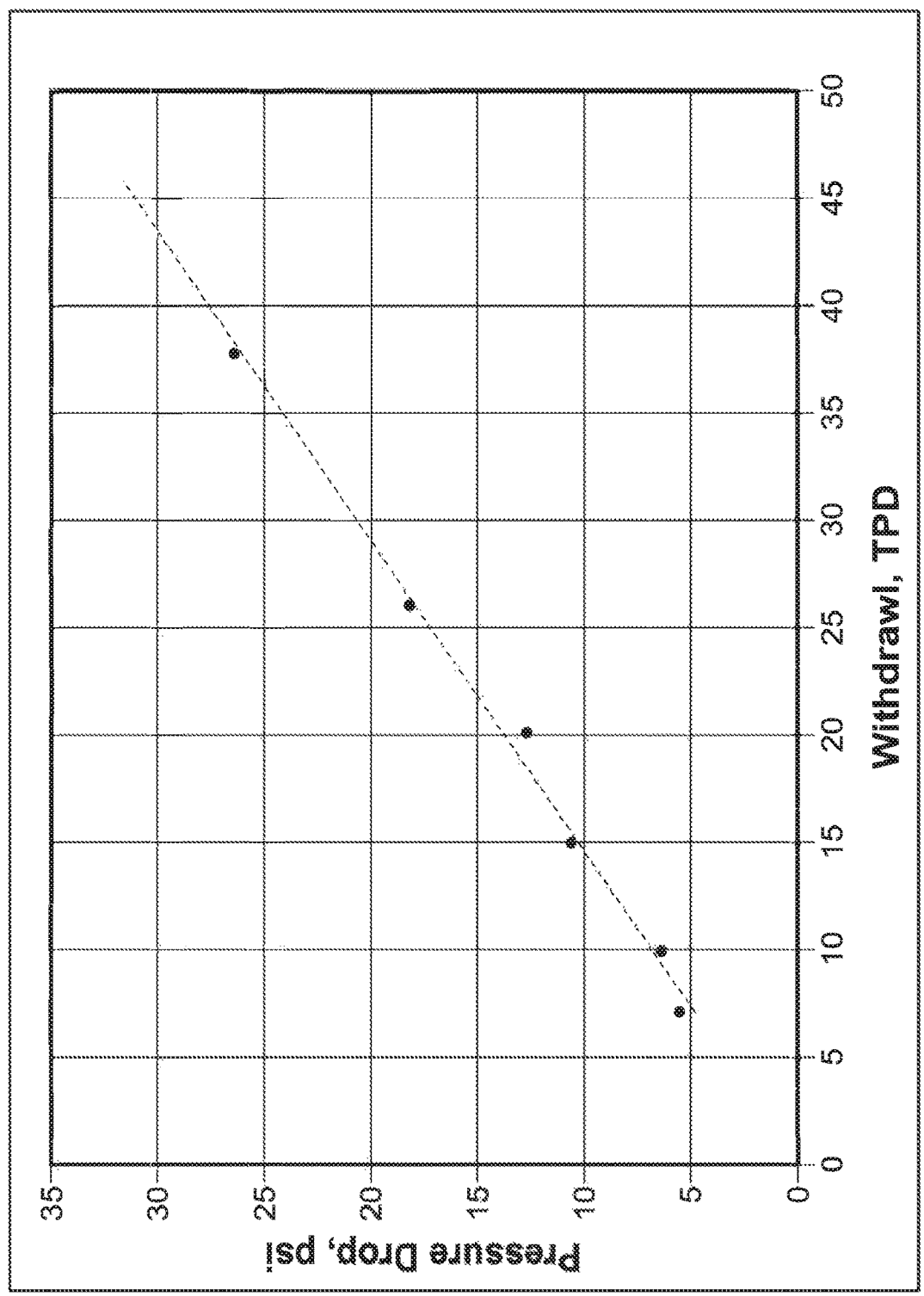

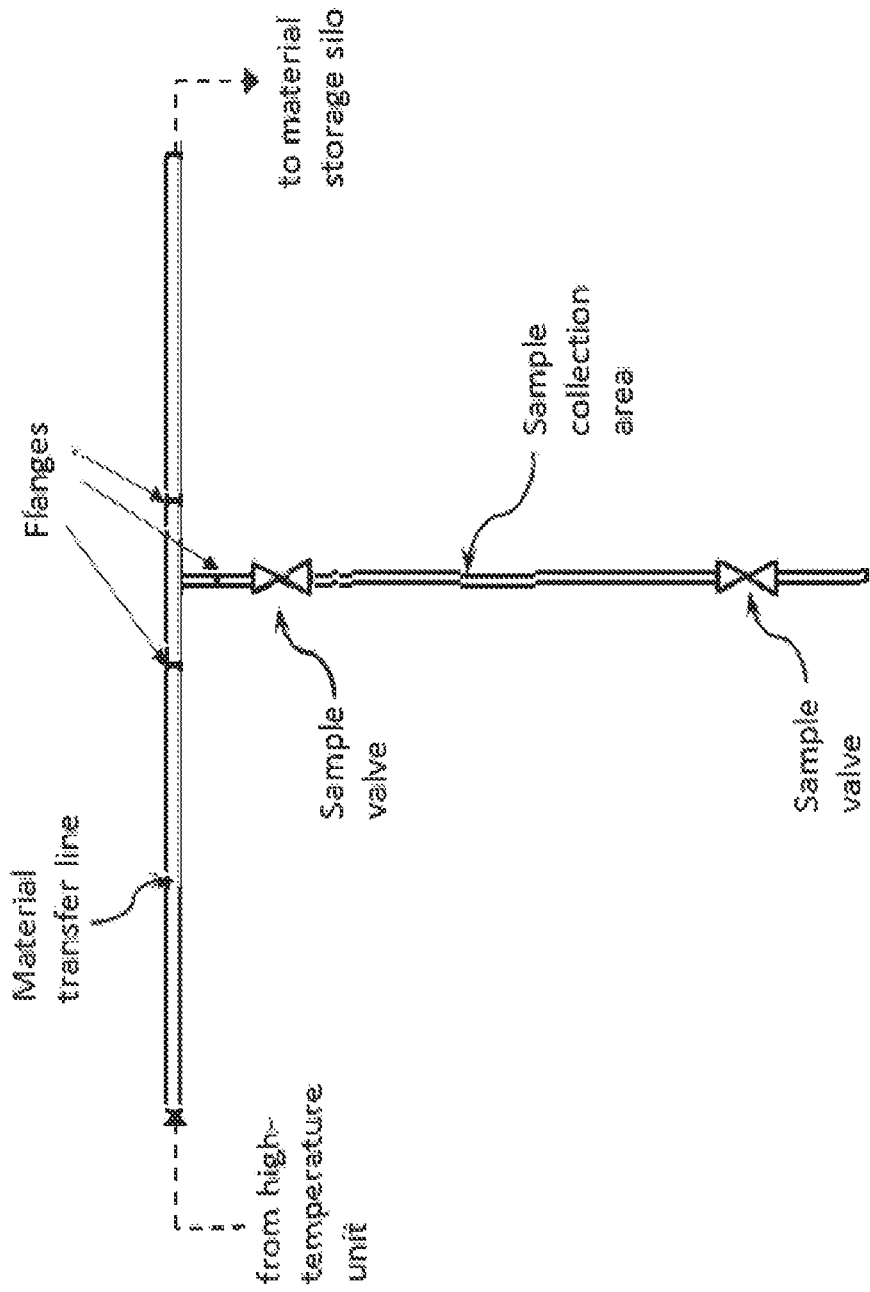

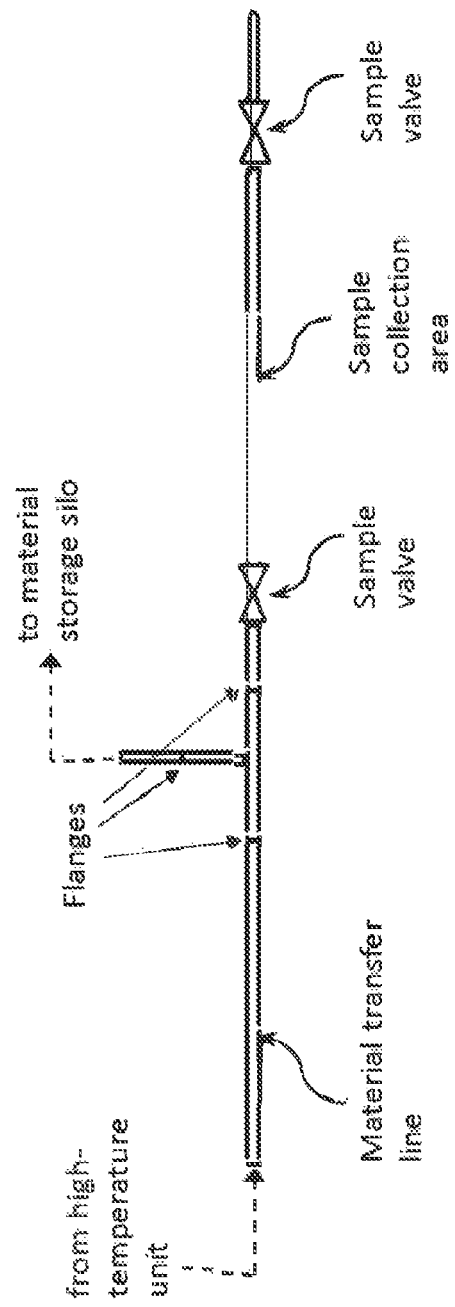
FIGURE 4: Sampling station for high-temperature particulate samples located on the blind of a "Smart Tee"

WITHDRAWAL SYSTEM

FIELD OF THE INVENTION

The invention is a withdrawal system, in particular for withdrawing particulate matter from a high-temperature industrial process such as a fluid catalytic cracking ("FCC") process.

BACKGROUND OF THE INVENTION

A conventional fluid catalytic cracking system generally includes a fluid catalytic cracking (FCC) unit coupled to a catalyst injection system, a petroleum feed stock source, and a distillation system. The FCC unit includes a regenerator and a reactor. The reactor primarily houses the catalytic cracking reaction of the petroleum feed stock and delivers the cracked product in vapor form to the distillation system. Spent catalyst from the cracking reaction is transferred from the reactor to the regenerator to regenerate the catalyst by removing coke and other materials. The regenerated catalyst is then reintroduced into the reactor to continue the petroleum cracking process. The catalyst injection system maintains a continuous or semi continuous addition of fresh catalyst to the inventory circulating between a regenerator and a reactor.

During the catalytic process, there is a dynamic balance of the total catalyst within the FCC unit. For example, catalyst is periodically added utilizing the catalyst injection system and some catalyst is lost in various ways such as through the distillation system, through the effluent exiting the regenerator, etc. If the amount of catalyst within the FCC unit diminishes over time, the performance and desired output of the FCC unit will diminish, and the FCC unit will become inoperable. Conversely, if the catalyst inventory in the FCC unit increases over time or becomes deactivated, the catalyst bed level within the regenerator reaches an upper operating limit and the deactivated or excess catalyst is withdrawn to prevent unacceptably high catalyst emissions into the flue gas stream, or other process upsets. Thus, the typical fluid catalytic cracking system also contains a withdrawal apparatus suitable for withdrawing materials from one or more units, like FCC units.

U.S. Pat. No. 7,431,894 teaches a catalyst withdrawal apparatus and method for regulating catalyst inventory in a fluid catalytic cracking catalyst (FCC) unit. The apparatus includes a pressure vessel having a metering device coupled to a fill port. A heat dissipater is located adjacent the metering device and is adapted to cool catalyst entering the pressure vessel. A sensor (such as a load cell) is coupled to the pressure vessel arranged to provide a metric indicative of catalyst entering the pressure vessel through the metering device. Cooled catalyst in the pressure vessel is then sent to spent catalyst storage (a material storage silo).

U.S. Pat. No. 8,092,756 teaches a catalyst withdrawal apparatus and method for regulating catalyst inventory in a unit. Various embodiments comprise a vessel that is suitable for high temperature operation and has an inlet coupled to the unit and an outlet, or include a vessel and a heat exchanger coupled to the vessel wherein the vessel is suitable for high temperature operation. U.S. Pat. No. 8,092,756 shows that catalyst from the vessel is then disposed to ECAT (i.e., an equilibrium/spent catalyst storage).

U.S. Pat. No. 8,146,414 teaches a method comprising withdrawing material from a FCC unit to a heat exchanger coupled to the fluid catalytic cracking unit. The heat exchanger has a material inlet; a material outlet; a cooling fluid inlet and a cooling fluid outlet with respective temperatures. The method further comprises measuring the respective temperatures at the material inlet, material outlet, cooling fluid inlet and cooling fluid outlet of the heat exchanger; determining a change in temperature between the material inlet and material outlet and determining a change in temperature between the cooling fluid inlet and cooling fluid outlet; and correlating the change in temperature between the material inlet and material outlet and the change in temperature between the cooling fluid inlet and cooling fluid outlet to a metric of material withdrawn from the unit. The cooled material is then sent to a vessel. U.S. Pat. No. 8,146,414 further teaches that the material from a FCC unit may alternatively be sent to a vessel suitable for high temperature operation, and then sent to spent catalyst storage/disposal.

All of the prior art systems and processes teach the use of expensive equipment and techniques to move catalyst from a high-temperature unit to a material storage silo or spent catalyst storage. It is therefore desirable to attain an improved withdrawal system for withdrawing particulate material from high temperature operations such as fluid catalytic cracking ("FCC") process, in particular a system that can accurately measure the amount of withdrawn material without the need for added equipment. We have discovered a new withdrawal system for withdrawing particulate material from industrial processes.

SUMMARY OF THE INVENTION

The invention includes a withdrawal system for withdrawing particulate matter from a high-temperature unit of a high-temperature industrial process. The withdrawal system comprises a material storage silo that comprises a vent line containing a first vent valve, one or more temperature sensors to measure temperature of the particulate matter in the material transfer line, and a controller that receives output measurements from the one or more temperature sensors to monitor and control flow of the particulate matter. The system does not contain a receiving vessel located in the material transfer line between the high-temperature unit and the material storage silo. The invention allows for the elimination of the intermediary receiving vessel which reduces the cost of the material withdrawal system and the footprint of the system thus making it easier to install in a space-constrained location.

BRIEF DESCRIPTION OF THE DRAWINGS

FIG. 1 shows a temperature profile for material withdrawal along the length of the material transfer line.

FIG. 2 shows the correlation between pressure drop through a heat exchanger and catalyst withdrawal rate.

FIG. 3 shows a sampling station for collecting high-temperature particulate matter (such as ECAT catalyst) samples from a material transfer line of a continuous withdrawal system.

FIG. 4 shows a sampling station for collecting high-temperature particulate matter (such as ECAT catalyst) samples located on the blind of a "Smart Tee" in the material transfer line.

DETAILED DESCRIPTION OF THE INVENTION

The invention includes a withdrawal system for withdrawing particulate matter from a high-temperature unit of a high-temperature industrial process. Preferable high-temperature units include units for manufacture of pyridine and its derivatives the manufacture of acrylonitrile, methanol conversion units to convert methanol to olefins or other products (MTX processes), fluid catalytic cracking (FCC) units, and other units for chemical manufacturing processes. The particulate matter is preferably catalysts or additives that are added to the industrial process. The invention is particularly suited for withdrawing a mixture of powdered FCC catalysts and/or additives and air that is withdrawn from a fluid catalytic cracking unit. These materials may be withdrawn from a FCC unit at temperatures of up to approximately 750° C.

The withdrawal system also comprises a material storage silo. Material storage silos are usually large capacity storage vessels located near to the catalytic process in question, which are designed to receive the catalyst which is withdrawn from the process. The material storage silo of the invention comprises a vent line containing a first vent valve. The vent line also preferably contains a filtering means in addition to the first vent valve. The filtering means functions to filter catalyst fines so that they are not released to the atmosphere. Suitable filtering means include a filter, an electrostatic precipitator, a pebble bed, a cyclone, and the like. Suitable filters include a bag filter, ceramic filters, and a sintered metal filter. Preferred filtering means include a bag filter and a sintered metal filter.

The withdrawal system also comprises a material transfer line that connects the high-temperature unit to the material storage silo. The material transfer line preferably comprises conduit pipe that allows the flow of particulate material from the high-temperature unit to the material storage silo. Such conduit piping should ideally have the minimum number of elbows and elevation changes to minimize the pressure drop in this conduit piping. This conduit piping may include a section specifically designed to enhance the transfer of heat from the piping. An example of such a section would be the heat exchanger described in U.S. Pat. No. 7,431,894, the teachings of which are incorporated herein by reference, and the exchanger specified in U.S. Pat. Appl. Pub. No. 2016/0258689, the teachings of which are incorporated herein by reference.

Preferably, the material transfer line is a finned tube of conduit piping to provide heat transfer capacity which results in a significant increase in heat transfer area, and will result in much cooler catalyst entering the material storage silo. The finned piping contains external cooling fins. These fins are attached to the exterior surface of the pipe in a conventional manner that will be very familiar to those who are skilled in the art of manufacturing conventional air-cooled heat exchangers. The fins are typically external projections on the piping that extend the surface in contact with the cooling/heating medium (i.e., ambient air). These fins can be lateral fins of various thicknesses, sizes and materials; they can be circular, square or with serrated edges; in addition, the fins may include studs, pegs and other shapes which help to maximize the transfer of heat between the ambient air and the fluid particulate mixture, as determined in the art of designing heat exchangers. The material of the fins is selected to allow maximum heat transfer, and the shape and attachment of the fins is designed to withstand the cyclic thermal stresses involved in such a service. The use of external fins allows for rapid cooling of the piping contents. Heat lost will go to ambient air.

The withdrawal system of the invention does not contain a receiving vessel located in the material transfer line between the high-temperature unit and the material storage silo.

The withdrawal system also comprises one or more temperature sensors to measure temperature of particulate matter in the material transfer line. The one or more temperature sensors are used to regulate the catalyst flow using temperature readings on the material transfer line itself. This is different from prior withdrawal systems which typically regulated catalyst withdrawal flow based on loadcell readings on the intermediary receiving vessel. At least one temperature sensor will preferably be located at the end of the catalyst withdrawal line, where it discharges into the material storage silo. The catalyst flow can be regulated by maintaining the temperature of this temperature sensor at a preset value. Preferably, there will be more than one temperature sensor located at different lengths along the material transfer line. For example, three temperature sensors may be located one-third of the way from the high-temperature unit, a second at two-third of the way from the high-temperature unit, and a third at the outlet to the material storage silo.

The withdrawal system comprises a controller that receives the output measurements from the temperature sensors to monitor and control the catalyst flow. This may be done by performing calculations of the heat loss from the catalyst withdrawal line itself. Using previously established heat transfer coefficients, and the known geometry and surface area of the pipe, the temperature profile can be measured at different points along the pipe to back-calculate the particulate matter withdrawal rate.

The particulate velocity through the material transfer line is preferably independently controlled by transport air flow, and using the known flow conditions in the transfer line. The transport air flowrate is set using a standard flow controller, many types of which are well known to those skilled in the art. The flow is measured by standard techniques such as pitot tubes, venturi meters, orifice plates, etc. and controlled by a variable position control valve, although other industry standard methods of control can be used. From this known mass flow, the actual flowing velocity at all points in the transfer line can be calculated using standard thermodynamic corrections for the true pressure and temperature in different parts of the transfer pipe, for example using the equation $PV=nRT$.

The particulate matter withdrawal rate is preferably adjusted by regulating the pressure in the material storage silo, and controlled to maintain a constant target temperature on at least one of the temperature sensors on the withdrawal line. This pressure control can be accomplished by several different methods well known to those skilled in the art. Preferably, such control is obtained by the operation of a control valve on the outlet side of the preferable filtering means on the vent line from material storage silo.

It will be necessary to maintain tight control of the pressure in the material storage silo to accurately control the catalyst withdrawal rate. The pressure is preferably increased in vented vessels by restricting the vent rate, and allowing pressure to build up gradually. With smaller vessels, the response time for the pressure build-up may be acceptably fast. Since material storage silos are much larger vessels than the typical receiving vessels that have been used in the withdrawal line to collect particulate matter prior to dispensing to a material storage silo, the response time for pressure build-up within the material storage silo will be much slower. Therefore, the material storage silo preferably contains an inlet line to add plant air to more quickly increase the pressure within the silo.

The pressure is preferably decreased by increasing the vent rate, and allowing pressure to drop gradually. With smaller vessels, the response time for the pressure reduction is usually acceptably fast. Since material storage silos are much larger vessels than the typical receiving vessels that have been used in the withdrawal line to collect particulate matter prior to dispensing to a material storage silo, the response time may be slowed considerably due to the large volume of the material storage silo. In order to speed pressure decrease within the material storage silo, the silo preferably comprises a second, larger, vent valve which could be used to allow the pressure in the silo to respond a lot faster when the pressure needs to decrease.

The receiving vessel in a typical withdrawal system is a small vessel, located at grade. The flow of withdrawn material from a high temperature unit such as a FCC regenerator therefore generally flows "downhill" from the regenerator to the receiving vessel. A big part of the pressure gradient in catalyst flow is caused by the static head difference, rather than frictional pressure loss. This downhill flow actually allows higher flowrates than the operator might otherwise be expected to be able to achieve.

Because material storage silos are typically very tall structures, the particulate matter from the high-temperature unit will need to flow "uphill" to enter the silo. This will cause a significant increase in pressure drop, which might end up restricting the withdrawal rate of the particulate matter. There are two preferably ways to deal with this. First, the withdrawal line may be made to be a wider diameter. This will result in a lower average density of particulate matter in the pipe, reducing the static head requirement. Second, a vacuum ejector may be used to apply a negative pressure (vacuum) to the material storage silo. This will increase the amount of delta P available, preventing the need to use a wider pipe diameter.

Provided that the temperature of the selected temperature sensor(s) remains constant, the withdrawal rate should also be constant at constant ambient conditions. FIG. 1 demonstrates the use of temperature measurements to measure flow rate. At high rates (the dashed line in the graph), the particulate matter leaving the regen may be about 650° C. (about 1200 F), and the temperature will decrease along the length of the withdrawal line until it reaches a level of approximately 55° C. (about 130 F) entering the material storage silo on the right hand side of the graph. However, at a much lower withdrawal rate (the solid line in the graph), the particulate matter may reach a temperature of approximately 55° C. (about 130 F) by the time it has travelled just half way along the withdrawal line. It will continue to cool down the remainder of the line, but it will probably still be about 38° C. (about 100 F) as it enters the material storage silo.

In such circumstances, controlling the catalyst flow using a temperature sensor which is located at the end of the withdrawal line, at the inlet to the material storage silo may not be ideal. In order to control accurately, the measured temperature should preferably change rapidly and by a large amount in response to changes in the actual withdrawal rate. In this circumstance, it may be preferable to use a temperature sensor which is located ⅓ of the way along the withdrawal line (for example) for control purposes. Such a temperature sensor will show much larger changes in temperature in response to changes in withdrawal rate, making for easier control. In a similar manner, a high withdrawal rates it may be preferable to use a temperature sensor which is located closer to the entry to the material storage silo to get the optimum control response.

In climates where the weather is not stable, it may also prove necessary to measure the ambient temperature and/or precipitation rates and to use these values to correct the heat transfer calculations mentioned above to ensure that the effect of these variables on the calculated catalyst flowrate is allowed for. For example, lower ambient temperatures will result in higher heat transfer rates, and so will precipitation. These effects can be very significant, and their effect on the heat transfer calculations is well known to those who are skilled in the art of designing heat exchangers.

One preferable way of making this heat transfer adjustment is to measure the skin temperature of the exposed metal surface of the high-temperature unit (e.g., an FCC regenerator vessel), at a point where it is exposed to the same weather conditions as the catalyst transfer line. In an FCC operation, the FCC regenerator vessel also contains catalyst at elevated temperatures (approximately 760° C. or 1400 F). The cooling of the metal surface of this vessel will therefore be affected by ambient conditions in a very similar way to the catalyst transfer pipe. Measuring changes in this skin temperature as ambient weather conditions change, therefore allows the effects of these same ambient weather conditions on the heat transfer from the catalyst transfer pipe to be estimated.

Preferably, the control system will be set up to use any of several temperature sensors along the length of the withdrawal piping, and may dynamically select the most appropriate temperature sensor depending on circumstances.

Although not necessary to the operation of the withdrawal system, the withdrawal system may preferably comprise a heat exchanger comprising an inlet end and an outlet end. The heat exchanger may be any heat exchanger known for cooling particulate material from a high-temperature industrial process. Preferably, the heat exchanger has a first pipe comprising a particulate material inlet and a particulate material outlet, wherein the first pipe is contained within a housing having a cooling fluid inlet and a cooling fluid outlet; and sensors to measure the respective temperatures at the material inlet, material outlet, cooling fluid inlet and cooling fluid outlet, as described in U.S. Pat. No. 8,146,414, the teachings of which are incorporated herein by reference, or U.S. Pat. Appl. Pub. No. 2016/0258689, the teachings of which are incorporated herein by reference.

In a particularly preferred embodiment, the heat exchanger comprises a structure comprising a rectangular frame, preferably a square frame, as described in U.S. Pat. Appl. Pub. No. 2016/0258689 (application Ser. No. 15/060, 088), the teachings of which are incorporated herein by reference. The rectangular frame is preferably a metal frame. The rectangular frame supports piping, which completes at least one circumference around the rectangular frame. Preferably, the piping completes at least two circumferences around the rectangular frame.

The piping is supported to the frame on a series of moving supports. The moving supports are designed to allow the piping to move horizontally but limit movement vertically. The moving supports are preferably spring hangers or sliding plates. One configuration of moving supports consists of a shoe which is attached to the underside of the pipe, and a corresponding support plate supported off the main structure. The shoe is preferably arranged so that the flat surface of the shoe can slide on the support plate in the x or y direction in any horizontal plane. This movement of the shoe on this plane is ideally unconstrained, although in some circumstances it may be preferable to restrict the degree of movement to prevent the shoe from slipping off the support plate. Preferably, there is a low friction coating applied to the base of the shoe and the upper surface of the support plate, to allow the shoe to move freely. Examples of such coatings might be PTFE, graphite, or other similar low friction materials.

As the piping heats up as hot particulate matter moves through the piping, the net effect of thermal expansion of the pipe will be to elongate each side of the rectangular frame. The use of the series of moving supports allows to piping to be free to elongate as the piping expands, and thus allows for this expansion. Preferably, there will be a limited number of fixed support points to keep the whole structure rigid, including at the inlet end and at the termination of each complete circumference. However, these could be located at various locations to help control the movement. The rectangular shape grants an inherent stability of shape to the piping, allowing sufficient movement to handle expansion without allowing the loops to break free from the structure. This means that the moving supports do not need to be too restrictive. As all four sides of the piping circumference expand together, this results in the piping moving slightly away from the frame and the whole "rectangular" circumference of piping may move a few inches outwards, away from the supporting structure. Anyone skilled in the art of designing piping supports will understand how to support the piping in this invention.

The piping comprises a piping inlet end and a piping outlet end, and contains external cooling fins. The piping inlet end is preferably connected to the industrial process, and in particular to the regenerator of an FCC unit. The piping outlet end of the piping is connected to two or more collection vessels.

The piping may be arranged so that after one complete circumference of the frame, the outlet end of the piping is just above the inlet end of the piping; alternatively, the piping may be arranged so that after one complete circumference of the frame, the outlet end of the piping is just below the inlet end of the piping. This spiral arrangement allows for the tubes to be located in close proximity to each other in the vertical direction. This is ideal for minimizing the amount of cooling air that bypasses around the cooling fins. The vertical offset between each successive piping circumference is ideally set to closely match the overall height of each section of finned piping.

Preferably, at each corner of each piping circumference (i.e., at the corners of the rectangular frame) the piping will be connected with a pipe tee with one end sealed (a "blind tee", as known in the art) to ensure that erosion from the powder flowing inside the piping is minimized. In conventional liquid or gas flow piping service changes in direction are made by the use of short radius, or long radius pipe elbows. While these elbows can be used in service where powders are transported in air, they are very prone to erosion. The preferred design is to use a pipe tee instead of an elbow in this service, where the tee is arranged with one end sealed using a blind flange. In this way, the catalyst that flows into the tee fills up the blind end. As additional catalyst flows into the tee it is then forced to turn by bouncing off the catalyst that has settled inside the blind tee. This means that the erosional force of the catalyst flow is expended on the packed bed of catalyst in the tee, rather than on the piping walls. This results in significantly reduced piping erosion. These tees will also help to dissipate piping stresses.

The rectangular frame heat exchanger also comprises one or more fans, which allows the cooling of the finned piping to be enhanced by drawing in ambient air over the fins on the piping. The velocity of air to be maintained over the fins is preferably a design variable. There is a trade-off between the power and size of the fan, and the heat exchange area required. For example, increasing the air velocity through the use of a larger, more powerful fan will result in more heat transfer, and reduce the number of circumferences required. However, as velocity continues to increase, the extra benefits gained become smaller.

Preferably, the fan is centrally located on the structure above the piping. An alternative arrangement is where the fan is arranged to blow cold air into the structure, instead of extracting hot air from the structure. In such an arrangement, it may be preferable to locate the fan underneath the structure instead of on the top.

When the rectangular frame is square in shape, one fan is preferably used. When the frame is a true rectangle, two or more fans are preferably used for optimum cooling/warming.

The structure is sealed except for where the finned piping is located, such that the sides of the structure are sealed except for openings in the structure for where the finned piping is located. This vent allows the cooling air to enter or leave the structure, such that the gaps in the sides around the finned piping allow the air that is drawn in by the fan to contact the finned piping at the maximum possible velocity.

Preferably, the rectangular frame heat exchanger is supported off the ground on one or more legs. More preferably, the rectangular frame heat exchanger is located above a pipe rack or similar structure. This location will preferably minimize the amount of ground space occupied by the heat exchanger.

When a heat exchanger as specified in application U.S. Pat. Appl. No. 2016/0258689 is utilized, the inventors have found that the catalyst flowrate can be accurately determined by the pressure drop across the exchanger. FIG. 2 shows the correlation between pressure drop and catalyst withdrawal rate. This method may be used alternatively, or in addition to, the heat transfer method described above. Obviously every exchanger will be designed slightly differently, and each will have its own line on such a graph. These lines can be predicted from theory, or tested in a shop before the system is shipped to the end user.

In a preferred embodiment, an addition to the system of the invention allows the operators of high-temperature processes units to collect high-temperature particulate matter samples (such as ECAT catalyst from an FCC regenerator) in a safe manner. In high-temperature processes, samples are routinely taken. For example, all refiners that operate FCC units take routine ECAT samples from the regenerator. These are typically sent to the refiner's fresh catalyst vendor (s) for testing. The results of this testing provides the refiner regular updates on the health and wellbeing of the circulating catalyst in the FCC. These samples are critical to the operation of the FCC as they allow the refiner to periodically adjust the addition rate of fresh catalyst to maintain the activity of the circulating inventory at the desired level and prevent the buildup of unwanted contaminants.

Capturing high-temperature samples, such as ECAT samples from a FCC regenerator, is a safety hazard all operators must currently deal with. For example, the catalyst within an FCC regenerator is extremely hot, 675° C. to 760° C. (1250 F to 1400 F), due to the combustion of the coke that is laid down on the catalyst via the cracking reactions that occur in the FCC reactor. Withdrawing this hot ECAT from the regenerator is a safety hazard, but unfortunately this is the safest place to withdrawal the catalyst as attempting to withdrawal the catalyst from any other point in the process would be much more hazardous as the catalyst is either mixed with hydrocarbons or has high coke levels both of which can lead to spontaneous combustion once exposed to the atmosphere.

The present withdrawal system provides an excellent means to alleviate the safety hazard of sampling the extremely hot particulate matter. This can be done in multiple ways which are outlined below.

Preferably, a sampling station is installed on the bottom of the material transfer line that connects the high-temperature unit to the material storage silo. FIG. 3 shows the sampling station at the bottom of the material transfer line. The sampling station comprises a simple double block valve configuration with sufficient pipe length between the valves to collect approximately 2 L of catalyst. Alternatively, the sampling station may be placed on the blind of a "Smart Tee" located in the material transfer line, as shown in FIG. 4. A "smart tee" is a means of providing an erosion resistant bend in a pipe. Powder flows are very erosive. If an ordinary elbow is used to change material flow direction at a bend, the elbow will erode away over time. The material flows into the space at the end of the tee, and fills it up. The rest of the catalyst turning the corner then bounces off that catalyst in the tee, rather than bouncing off the wall of the pipe as it changes direction. This results in much lower piping erosion rates on piping elbows.

The sampling station is installed either downstream of the exchanger and before the material storage silo, if the system contains an exchanger; or on the material transfer line between the high-temperature unit and the material storage silo if the system does not contain an exchanger. If installed in systems without an exchanger, the sampling station must be installed at an adequate distance from the high-temperature unit to allow sufficient cooling for the particulate matter.

Various type valves can be used for the double block system including gate valves (both with and without seat purges), ball valves and possibly even Everlasting valves In a different invention, the concept is also applicable to systems that have a receiving vessel or vessels located in material transfer lines between the high-temperature unit and the material storage silo. A cooled catalyst sample can be easily taken by installing a sampling station between the vessel isolation valve, sometimes known as the ESD valve, and the vessel catalyst on/off valve or Everlasting valve. The sampling station consist of a simple double block valve configuration with sufficient pipe length between the valves to collect approximately 2 L of catalyst.

We claim:

1. A withdrawal system for withdrawing particulate matter from a high-temperature unit of a high-temperature industrial process, said withdrawal system comprising: (a) a material storage silo that comprises a vent line containing a first vent valve and wherein the material storage silo further comprises vacuum ejector; (b) a material transfer line that connects the high-temperature unit to the material storage silo; (c) one or more temperature sensors to measure temperature of the material transfer line; and (d) a controller that receives output measurements from the one or more temperature sensors to monitor and control flow of the particulate matter, wherein the withdrawal system does not contain a receiving vessel located in the material transfer line between the high-temperature unit and the material storage silo.

2. The withdrawal system of claim 1, further comprising a heat exchanger connected to the material transfer line between the high-temperature unit and the material storage silo.

3. The withdrawal system of claim 2, wherein the heat exchanger comprises:
   (a) a structure comprising a rectangular frame;
   (b) piping that is supported by the rectangular frame and completes at least one circumference around the rectangular frame, wherein the piping is supported to the frame on a series of moving supports, and the piping comprises a piping inlet end and a piping outlet end, and the piping contains external cooling fins; and
   (c) one or more fans;
   wherein the structure is sealed except for where the piping is located.

4. The withdrawal system of claim 1, wherein high-temperature unit is a fluid catalytic cracking (FCC) unit.

5. The withdrawal system of claim 1, wherein the material transfer line is a finned tube of conduit piping that contains external cooling fins.

6. The withdrawal system of claim 1, having more than one temperature sensors located at different positions along the length of the material transfer line.

7. The withdrawal system of claim 1, wherein the material storage silo further comprises a second, larger vent valve.

8. The withdrawal system of claim 1, wherein the material storage silo further comprises an inlet line to add plant air.

9. The withdrawal system of claim 1, wherein the vent line further comprises a filtering means.

10. The withdrawal system of claim 9, wherein the filtering means is an electrostatic precipitator, a filter, a pebble bed, or a cyclone, and the like.

11. The withdrawal system of claim 9, wherein the filtering means is a bag filter or a sintered metal filter.

* * * * *